United States Patent Office 2,714,620
Patented Aug. 2, 1955

2,714,620

METHOD OF DESTROYING CATALYST RESIDUES

Robert F. Leary, Cranford, N. J., assignor to Esso Research and Engineering Company, a corporation of Delaware No Drawing. Application September 27, 1951, Serial No. 248,630

2 Claims. (Cl. 260—669)

This invention relates to an improved method for the destruction of catalyst residues and relates more particularly to the destruction of residues of alkali metals, such as sodium, used in the polymerization of various types of unsaturated hydrocarbons.

Many types of hydrocarbon polymerizations employ alkali metals as the catalyst. Principal among these polymerizations are the polymerization of butadiene and the copolymerization of butadiene and styrene to oily and solid rubbery polymers. Sodium is the most generally used of the alkali metals, but potassium can also be employed. At the end of the reaction the excess unreacted catalyst must be destroyed to prevent further polymerization and the consumed catalyst is to be removed from its complex with the polymer. Various materials have been used for this purpose. For example, alcohols, such as methanol, and organic acids, such as acetic and other fatty acids, can be used. Acetic acid is used because of its convenience, ready availability, and cheapness. However, it has the disadvantage of giving a precipitate (sodium acetate) which is of such a character that long filtration times are required even when the acid is used in only slight excess. Furthermore, the time required to destroy the sodium is quite long, depending on the particle size of the sodium and the temperature at which the reaction is carried out.

The present invention provides an improved process for the mass polymerization of polymerizable organic compounds catalyzed by an alkali metal. It provides an improved process particularly applicable to the polymerization of conjugated diolefins wherein the polymerization may be carried out without the above difficulties.

It is, therefore, the major object of the present invention to provide a method for effectively destroying the catalyst used in the polymerization of conjugated diolefins.

In accordance with this invention, this and other objects of the invention are accomplished by adding at least two molar equivalents of the acid, preferably 2.2 to 3, per molar equivalent of alkali metal to the reactor contents and allowing the mixture to stand for a time sufficient to complete the reaction between the alkali metal and the acetic acid. The use of acetic acid in this molar range results in a great increase in the speed of the reaction and also greatly improves the filtration characteristics of the precipitate.

The acetic acid used may be of any desired concentration above about 85 per cent, but is preferably employed in the form of glacial acetic acid.

The invention is particularly adapted to processes for the preparation of drying oils by the copolymerization of butadiene and styrene. Thus the invention has specific application to the preparation of drying oils by polymerizing 60 to 95 parts of butadiene with 40 to 5 parts of styrene, preferably about 75 to 85 parts of the former and 25 to 15 parts of the latter, the polymerization being carried out at 20–100° C., preferably between 40 and 90° C., in a reaction diluent. As a polymerization catalyst about 1.5 to 10 parts, preferably about 1.5 to 3 parts of a finely divided metallic sodium catalyst is used in the optional presence of various polymerization modifiers which tend to promote the reaction and produce colorless products of more reproducible drying rates. As an inert reaction diluent it is desirable to use, for example, a naphtha of boiling range between about 90–180° C. or a straight run mineral spirit such as Varsol (boiling range 150–200° C.) or inert hydrocarbon diluents boiling between +20° C. and 200° C. such as pentane, xylene, toluene, benzene, cyclohexane or the like, individually or in admixture with each other. The diluents are usually used in amounts ranging from 50 to 500, preferably 150 to 300, parts per 100 parts of monomers. Various ethers having more than two carbon atoms per molecule such as diethyl ether, diisopropyl ether, dioxane, vinyl ethyl ether, vinyl isobutyl ether, anisole, and phenetole, are also useful as diluents and are particularly helpful as co-diluents to insure formation of colorless products when used in amounts ranging from about 10 to 35 parts per 100 parts of monomers, together with the aforesaid amount of inert diluent such as solvent naphtha. Other means of modifying the polymer properties involve the substitution of all or part of the butadiene feed with other diolefins such as isoprene, piperylene, 2,3-dimethyl butadiene-1,3, or 2-methylpentadiene-1,3. Also, instead of styrene, various ring substituted alkyl styrenes such as p-methyl styrene or p-ethyl styrene or the dimethyl styrenes may be used.

Especially where a relatively coarse dispersion of sodium is used as catalyst, it is also advantageous to use about 1 to 50 weight per cent, preferably 10 to 20 wt. per cent based on sodium of a $C_1$ to $C_5$ aliphatic alcohol. Secondary and tertiary alcohols, particularly isopropanol or tertiary butanols are preferred. Such alcohols act as polymerization promoters. Conversions of 50 to 100 per cent on monomers are readily realized in batch as well as in continuous polymerization, although the catalyst requirements are greater for continous than for batch operation.

While the invention has specific practical application to the preparation of drying oils by copolymerization of butadiene and styrene, it is not limited to such processes, but finds application in all processes wherein alkali metals such as sodium or potassium are used as catalysts, regardless of the product being manufactured. Thus the invention may be used to destroy the catalyst in any process for making resins or rubbery polymers involving the use of alkali metal catalysts.

The following examples illustrate the benefits to be obtained by this invention:

*Example 1*

2 g. of finely divided sodium dispersed in 10 g. of naphtha was added to a 35% solution of an 80–20 butadiene-styrene oily polymer in naphtha. This polymer had previously been prepared as described above with sodium catalyst, and the catalyst removed. Acetic acid was dropped from a burette into the dispersion with stirring, the acid being added at the rate of 20 drops/35 seconds. After 10 cc. of acid was added, the solution was stirred 15 minutes, a maximum temperature of 55° C. being reached. A further 1 cc. of acid was then added at the same rate, for a total of about 2.2 molar equivalents of acid/mole of sodium. At the end of this time the dispersion was stirred for 30 minutes, after which the reaction appeared to be complete.

*Example 2*

A companion experiment was carried out in exactly the same manner except that only 9 cc. of acid, or about 1.8 equivalents, was used. Thirty minutes of stirring after the acid was added did not suffice to complete the reaction, as shown by the characteristic grey color of unreacted sodium and the bubbling action as hydrogen was evolved. After standing 3 hours with occasional shaking, and after standing overnight, the reaction was still not completed.

*Example 3*

An experiment was carried out in the same manner as in Example 1, except that 20 g. diethyl ether was added to the dispersion, and only 6 cc. of acid, or about 1.2 equivalents, was added. After four hours of stirring, the reaction was not complete.

*Example 4*

Two runs were made by placing the following materials in a bomb and shaking for 20 hours at 50° C.:

| | |
|---|---|
| Naphtha | cc 400 |
| Toluene | cc 400 |
| Dioxane | cc 80 |
| Isopropyl alcohol | cc 1 |
| Butadiene | cc 340 |
| Sodium | g 4.5 |
| Styrene | cc 65 |

At the end of this time, the butadiene and styrene were essentially completely copolymerized to an oily material. To the contents of bomb #1 were added, while stirring, 1.5 equivalents of acetic acid/sodium, and to #2, 2.5 equivalents of acetic acid. After standing 10 minutes, #2 was completely reacted and the precipitate had settled, leaving a clear supernatant liquor, while #1 was still reacting as shown by bubbling after 20 minutes standing. After one hour, #1 was apparently completely reacted, but the precipitate had not settled fully. Both the products were then filtered through paper in a Buchner funnel with house vacuum. #1 had not completely filtered in 4 hours, while #2 was completely filtered in less than 15 minutes.

*Example 5*

In a continuous pilot plant for the preparation of a synthetic drying oil by the copolymerization of 80 volume percent butadiene and 20 volume percent styrene at a temperature of about 50° C. in accordance with the process described and claimed in copending application, Serial No. 134,714 filed December 23, 1949, in the name of Stanley E. Jaros, Anthony L. Gleason and Robert F. Leary, a series of runs was carried out in which the molar ratio of acetic acid to sodium was varied from 1.0 to 2.5 The following results were obtained:

| Run | Mole Equivs. Acetic Acid | Filter Rate, gal./hr./ft.² | Average |
|---|---|---|---|
| 1 | 1.0 | 0.29 | |
| 2 | 1.2 | 0.49 | 0.38 |
| 3 | 1.6 | 0.37 | |
| 4 | 2.0 | 1.34 | |
| 5 | 2.0 | 3.78 | |
| 6 | 2.0 | 2.45 | 2.4 |
| 7 | 2.0 | 1.96 | |
| 8 | 2.5 | 1.47 | |
| 9 | 2.5 | 2.36 | 1.9 |
| 10 | 2.5 | 1.96 | |

The above examples all show that the catalyst is destroyed in a much quicker time and that the precipitate of sodium acetate obtained is rendered more easily filterable when the ratio of molar equivalents of acetic acid to sodium is at least 2 and preferably between 2.2 and 3.

The nature of the present invention having been thus fully set forth and specific examples of the same given, what is claimed as new and useful and desired to be secured by Letters Patent is:

1. In a process for the preparation of drying oils wherein 60 to 95 parts of butadiene are copolymerized with 40 to 5 parts of styrene at a temperature of 20–100° C. in the presence of 1.5 to 10 parts of finely divided metallic sodium and 50 to 100 parts of an inert hydrocarbon diluent boiling between 20° and 200° C., and wherein residual catalyst is removed upon completion of the reaction, the improvement which comprises treating the reaction product with 2 to 3 molar equivalents of at least 85% acetic acid to completely destroy the catalyst and provide an easily filterable product.

2. In a process for the treatment of a liquid copolymer produced by solution polymerization of 1,3 butadiene and a styrene in the presence of metallic sodium as a catalyst and in which a resulting liquid polymer is obtained which contains metallic sodium as an impurity, the improvement which comprises treating said liquid polymer with about two molor equivalents of acetic acid per molar equivalent of sodium.

References Cited in the file of this patent

UNITED STATES PATENTS

| | | |
|---|---|---|
| 2,209,746 | Ebert et al. | July 30, 1940 |
| 2,264,811 | Rothrock | Dec. 2, 1941 |
| 2,472,135 | Weizmann | June 7, 1949 |
| 2,527,768 | Schulze et al. | Oct. 31, 1950 |
| 2,568,950 | Crouch | Sept. 25, 1951 |